Aug. 7, 1956  E. L. ANDERSON ET AL  2,757,918
KERF CUTTING MINING MACHINE WITH CUTTINGS CONVEYOR
Filed Dec. 10, 1953  3 Sheets-Sheet 1
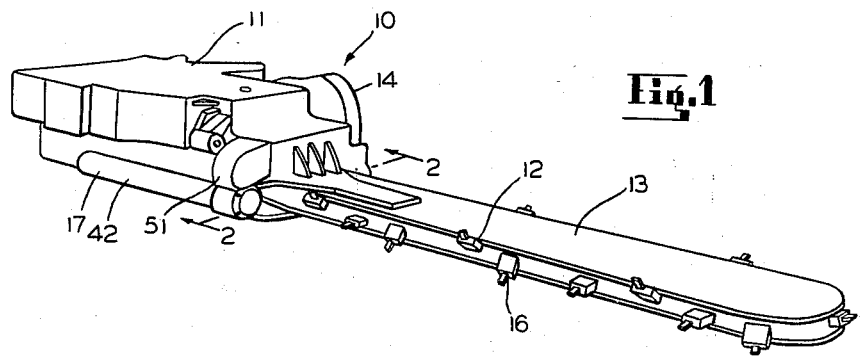
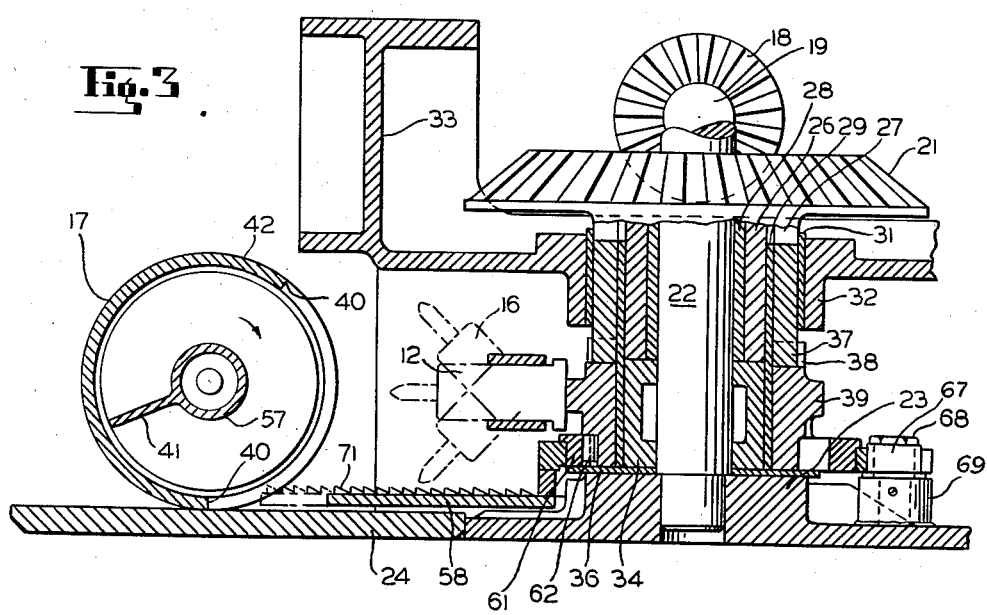
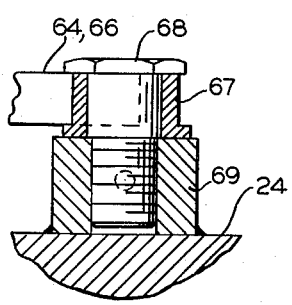
INVENTORS
EDWARD L. ANDERSON
GEORGE BODIN
BY Murray G. Gleeson
ATTORNEY

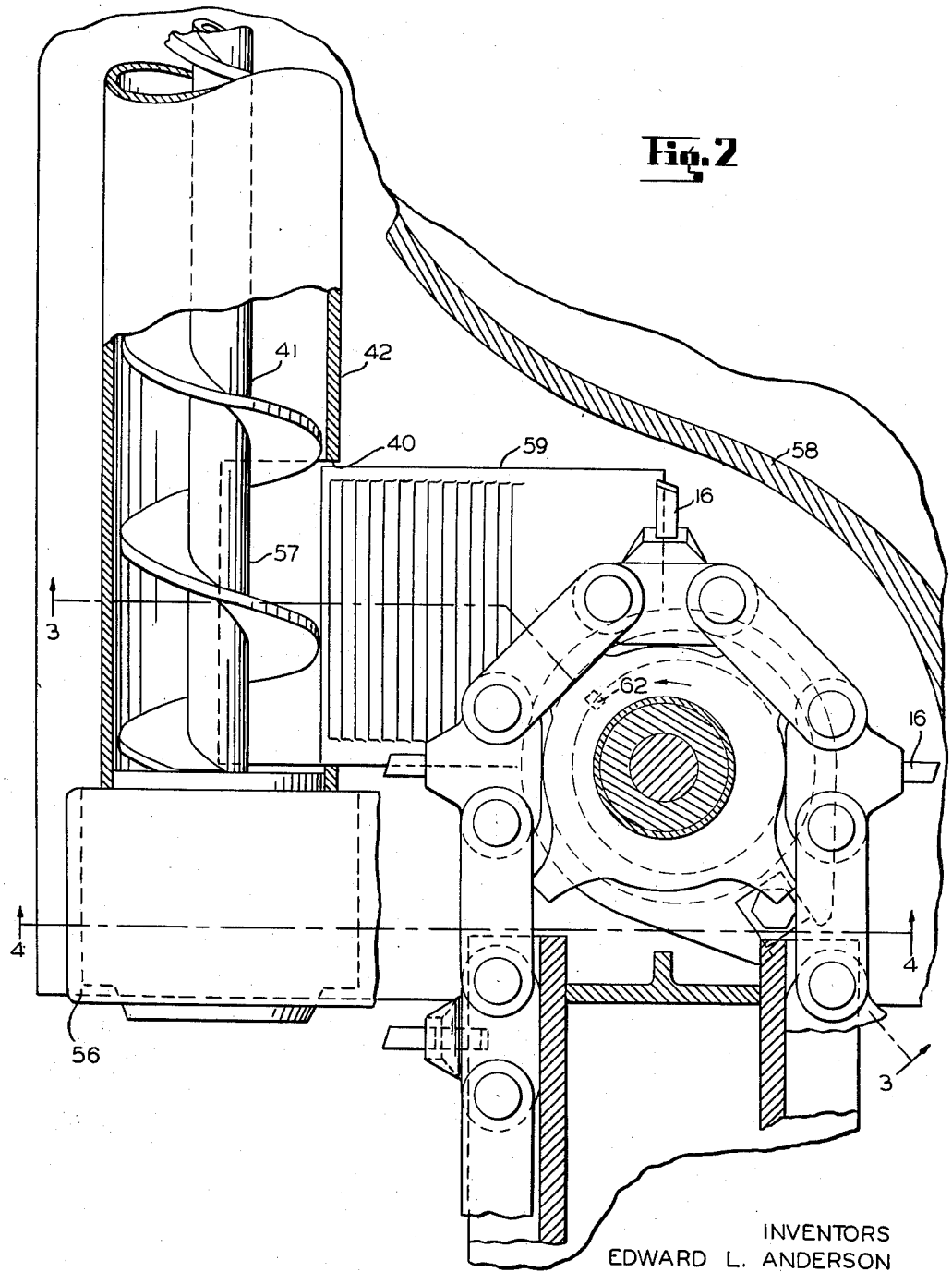

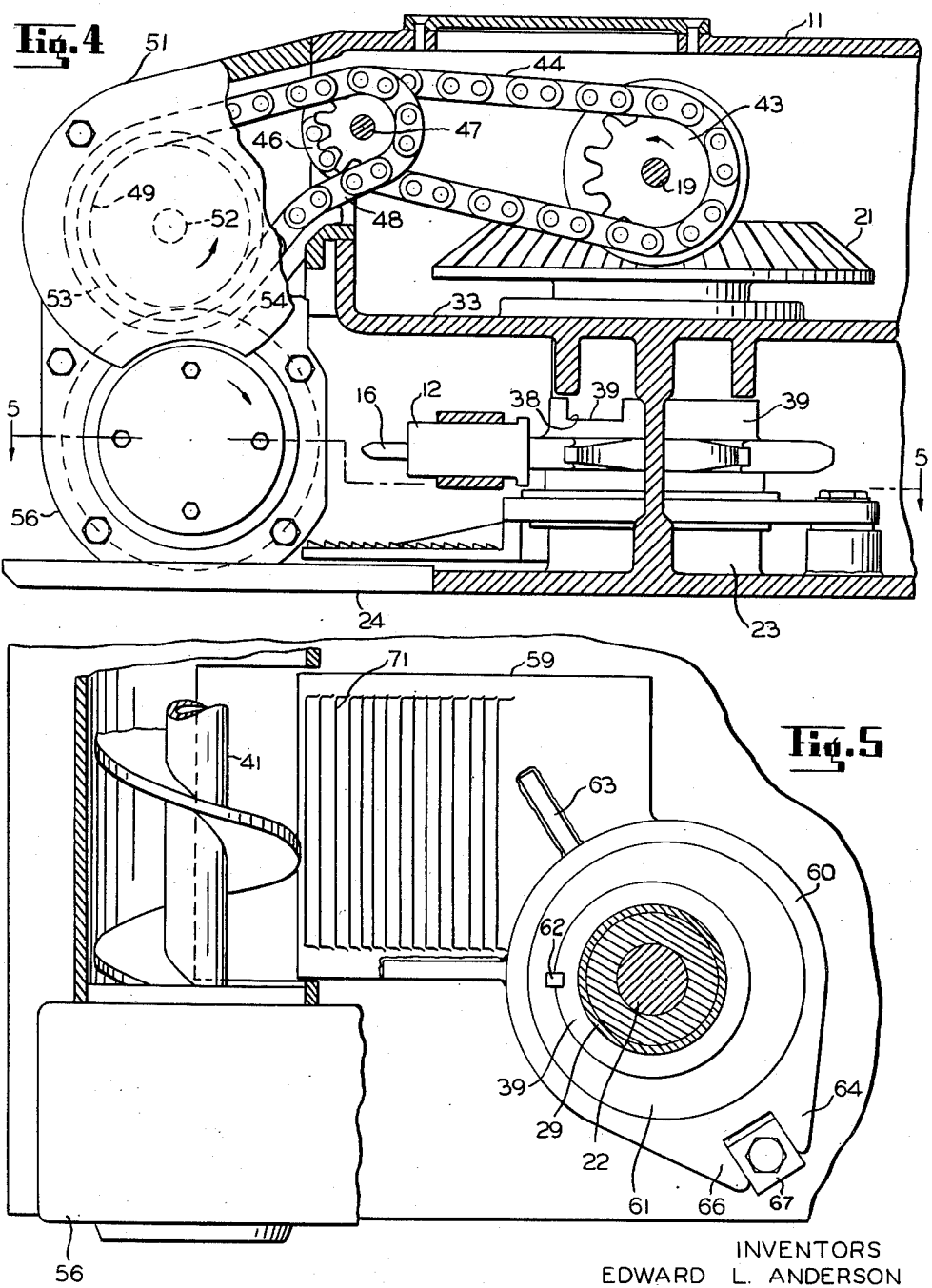

United States Patent Office 2,757,918
Patented Aug. 7, 1956

2,757,918

KERF CUTTING MINING MACHINE WITH CUTTINGS CONVEYOR

Edward L. Anderson and George Bodin, Chicago, Ill., assignors to Goodman Manufacturing Company, Chicago, Ill., a corporation of Illinois Application December 10, 1953, Serial No. 397,394

2 Claims. (Cl. 262—30)

This invention relates generally to machines for cutting kerfs in a solid seam of coal or the like, and relates more particularly to improvements in devices for conveying the cuttings away from such machines.

One of the principal objects of the invention is to provide a device whereby the cuttings will be advanced to the cuttings receiving portion of a cuttings discharge device of a kerf cutting machine, such device being driven from the drive sprocket of the cutter chain, and characterized by requiring no modification of the cutter chain driving means.

Other objects and important features of the invention will be apparent after a study of the following specification taken with the drawings, which together show a preferred embodiment of the invention and what is now considered to be the best mode of practicing the principles thereof. Other embodiments of the invention will be suggested to those having the benefit of the teachings herein, and it is therefore intended that such other embodiments be reserved especially as they fall within the scope and purview of the subjoined claims.

In the drawings:

Fig. 1 is a perspective view of a kerf cutting machine having embodied therein the improvements according to the present invention;

Fig. 2 is a horizontal section taken along the plane 2—2 of Fig. 1 looking in the direction of the arrows;

Fig. 3 is a vertical section taken along the line 3—3 of Fig. 2 and looking in the direction of the arrows;

Fig. 4 is a partly elevational and partly sectional view taken along the line 4—4 of Fig. 2 looking in the direction of the arrows;

Fig. 5 is a partly plan and partly sectional view taken along the line 5—5 of Fig. 4, looking in the direction of the arrows; and Fig. 6 is a detail of the means for mounting the cuttings moving device shown in Figs. 2, 3, 4 and 5.

Referring now to Fig. 1 of the drawings, the improvements according to the present invention are embodied in a kerf cutting machine referred to generally by the reference numeral 10. Such a machine includes a main frame or housing 11, enclosing driving means for a cutter chain 12 mounted to move in an orbital path upon a cutter bar 13. Such a machine is provided with draft means 14, only one of such draft means being shown, whereby the machine 10 may be sumped into a seam of coal or the like, and then moved laterally across the face of the seam to cut a kerf at the bottom thereof.

The precise construction of such a machine and the draft means for moving it with respect to a working face of a seam of coal form no part of the present invention. Suffice it to say, however, the action of the cutter chain 12 in moving orbitally upon the cutter bar 13 causes cutter bit elements 16 to convey cuttings back within the frame 11 of the machine 10. Such machines are generally provided with cuttings discharge devices which discharge the cuttings, called "bugdust," into a windrow to the side and the rear thereof. Such a cuttings discharge device is shown in Fig. 1 by the reference numeral 17, and it is to improvements in such devices, and to means for feeding cuttings to the material receiving portion thereof that this invention is particularly related.

The means for driving the cuttings discharge device 17 and the cutter chain 16 are best shown with reference to Figs. 2, 3 and 4 of the drawings. The frame 11 contains a drive motor, not shown, turning a bevel drive pinion 18 disposed on a drive shaft 19. The bevel pinion 18 meshes with a bevel gear 21 arranged to turn with respect to a dead shaft 22 having its lower end supported upon a pedestal 23 formed as part of a bottom plate of the housing 11.

The bevel gear 21 has an inner hub 26 and an outer hub 27 concentric therewith. The inner hub 26 turns on a bushing 28 and the outer hub 27 is spaced from the inner hub 26 by means of a concentric bushing 29. The outer hub 27 is also mounted to turn with the bevel gear 21 within a bushing 31 held in a support 32 formed as part of an internal stiffener structure 33 within the housing 11.

The innermost bushing 28 and the inner hub 26 rest upon a floating bearing member 34 which in turn rests upon a circular wear plate 36. The bushing 29 disposed between the concentric hubs 26 and 27 also surrounds the floating bearing 34 and extends downward as seen in Fig. 3 to the wear plate 36.

The outer hub 27 has end splines 37 which mate with end splines 38 of a driving sprocket 39. The endless cutter chain 12 carrying the cutter bits 16 thus is driven by the sprocket 39, and the cutter bits 16 in cutting a kerf in a seam of coal or the like carry with them the cuttings from the seam. Such cuttings are directed by means of the cutter bits 16 toward a screw conveyor shown in Fig. 2 and referred to generally by the reference numeral 41. The screw conveyor 41 turns within a tubular housing 42 mounted to one side of the kerf cutting machine 10 as seen in Fig. 1.

Power for driving the screw conveyor 41 is shown best with reference to Fig. 4, and includes a sprocket 43 driven from the shaft 19 supporting the driving pinion 18 for the bevel gear 21. The sprocket 43 has trained therearound a drive chain 44 which in turn meshes with a cluster idler sprocket 46 mounted upon an idler shaft 47 supported within the housing 11. A driven chain 48 is trained around one of the cluster sprockets 46 and in turn drives a sprocket 49 contained within a housing 51, see also Fig. 1, for the screw conveyor 41. The driven sprocket 49 is mounted fast upon a shaft 52 also having fast thereon a gear 53 driving a gear 54 contained within a housing 56, said gear 54 being mounted upon a tubular shaft 57 of the screw conveyor 41 and fast thereto.

As seen in Fig. 2, the housing 11 has a curved vertical wall 58 past which the cutter bits 16 must move in completing their reversing movement about the sprocket 39. In doing so, the cuttings carried by the cutter elements 16 are diverted to the opening 40 for the screw conveyor 41 in the tube 42.

However, there is a tendency for the cuttings to become packed tightly by the action of the cutter bits 16 so that the cuttings do not enter the opening 40 for removal by the screw conveyor 41.

In order to prevent such packing action of the cuttings, and to insure that they are constantly being directed to the opening 14 there is provided a paddle 59 which has a reciprocating movement in such a direction as to urge the cuttings towards the screw conveyor 41.

In order to provide reciprocating movement to the paddle 59 the sprocket 39 turns with an eccentric 61 which is made fast to the sprocket by means of a key 62, seen in Fig. 3. As seen with particular reference to Fig. 5, the eccentric 61 is surrounded by an eccentric follower 60 formed integrally with the paddle 59, the paddle 59 being held rigidly to the eccentric follower 60 by means of a rib 63.

The eccentric follower 60 is held against rotation with the eccentric 61 by means of spaced jaws 64 and 66 thereon which are located remotely from the paddle 59. The spaced jaws 64 and 66 embrace a square bronze or brass wear member and guide 67 which is retained in position by a cap screw 68 threaded into a pedestal or boss 69 extending upward from the lower plate 24 of the housing 11. As seen in Fig. 6, the brass wear member 67 is arranged to swivel upon the cap screw 68. Upon rotation of the eccentric 61 the follower 60 reciprocates, its jaws 64 and 66 sliding with respect to the wear member 67.

The paddle 59 is provided with serrations 71 along its upper surface, which serrations are so formed that they will urge the cuttings toward the helical screw 41 but will slip beneath same in the reverse direction of reciprocation.

The action of the paddle 59 is such that the cuttings are constantly agitated thereby, and will also be constantly urged in a direction towards the helical screw 41.

The construction described is of particular use in cases where the drive sprocket within the housing 11 does not carry auxiliary paddles for diverting the cuttings towards the conveyor screw. The construction described is particularly advantageous in the smaller type kerf cutting machines where space limitations do not enable the provision of the aforementioned sweeps.

While the invention has been described in terms of a preferred embodiment thereof its scope is not intended to be limited by the preferred embodiment herein shown and described, nor otherwise than by the terms of the claims here appended.

We claim as our invention:

1. In a kerf cutting machine of the type having a cutter bar provided with an endless cutter chain movable orbitally on said cutter bar, a drive sprocket for driving said cutter chain, a screw type cuttings conveyor having a cuttings receiving station thereon, said cuttings conveyor being disposed near said drive sprocket to receive the cuttings formed by said cutter chain in cutting said kerf, and means for urging the cuttings toward said conveyor, comprising an eccentric turning on a center coincident with the turning center of said sprocket, an eccentric follower coacting with said eccentric, said eccentric follower moving a cuttings engaging member integral therewith in reciprocatory fashion, said cuttings engaging member having an upper surface arranged to engage said cuttings in one direction of reciprocation thereof and to move beneath said cuttings in the opposite direction of reciprocation.

2. In a kerf cutting machine of the type having a cutter bar provided with an endless cutter chain movable orbitally on said cutter bar, a drive sprocket for driving said cutter chain, a screw type cuttings conveyor having a cuttings receiving station thereon, said cuttings conveyor being disposed near said drive sprocket to receive the cuttings formed by said cutter chain in cutting said kerf, and means for urging the cuttings toward said conveyor, comprising an eccentric turning on a center coincident with the turning center of said sprocket, an eccentric follower coacting with said eccentric, said eccentric follower moving a cuttings engaging member in reciprocatory fashion so as to divert cuttings from said cutter chain to said cuttings receiving station.

References Cited in the file of this patent

UNITED STATES PATENTS

| | | |
|---|---|---|
| 1,616,597 | Pray | Feb. 8, 1927 |
| 1,877,286 | Farnham | Sept. 13, 1932 |
| 2,352,795 | McCullough | July 4, 1944 |
| 2,687,288 | Simmons | Aug. 24, 1954 |